(12) United States Patent
Ippers et al.

(10) Patent No.: US 9,079,361 B2
(45) Date of Patent: *Jul. 14, 2015

(54) DEVICE AND METHOD FOR WELDING AND SEPARATING PACKAGING MATERIALS FOR A PACKAGE

(75) Inventors: Juergen Ippers, Grefrath (DE); Ulrich Wieduwilt, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 604 days.

This patent is subject to a terminal disclaimer.

(21) Appl. No.: 13/394,839

(22) PCT Filed: Sep. 27, 2010

(86) PCT No.: PCT/EP2010/064219
§ 371 (c)(1),
(2), (4) Date: Mar. 8, 2012

(87) PCT Pub. No.: WO2011/039131
PCT Pub. Date: Apr. 7, 2011

(65) Prior Publication Data
US 2012/0178604 A1    Jul. 12, 2012

(30) Foreign Application Priority Data
Oct. 2, 2009  (DE) .......................... 10 2009 045 299

(51) Int. Cl.
*B26D 7/08*       (2006.01)
*B65B 51/22*      (2006.01)
(Continued)

(52) U.S. Cl.
CPC ......... *B29C 66/81435* (2013.01); *B29C 65/087* (2013.01); *B29C 65/745* (2013.01);
(Continued)

(58) Field of Classification Search
CPC ...... B26D 7/086; B65B 51/22; B65B 51/225; B29C 65/00; B29C 66/8122; B29C 66/91421; B29C 66/1122; B29C 66/8511

USPC ......... 493/189, 199, 203, 205–206, 208, 340, 493/341, 370, 394, 197, 209; 83/956; 156/73.3, 580.2
See application file for complete search history.

(56) References Cited

U.S. PATENT DOCUMENTS 3,522,135 A * 7/1970 Page .............................. 156/498
3,943,686 A * 3/1976 Crawford et al. ............ 53/371.4
(Continued)

FOREIGN PATENT DOCUMENTS

DE    4439284 A1 *  4/1996
DE    29912490       2/2001
(Continued)

OTHER PUBLICATIONS

PCT/EP2010/064210 International Search Report.

*Primary Examiner* — Thanh Truong
*Assistant Examiner* — Praachi M Pathak
(74) *Attorney, Agent, or Firm* — Michael Best & Friedrich LLP

(57) ABSTRACT

The invention relates to a device for welding and separating a packaging material (4) for a package, comprising an ultrasonic welding device (2) with a sonotrode (3) and an anvil (5) for sealing the packaging material (4), wherein the sonotrode (3) is rotatable about a first axis of rotation (X) and the anvil (5) is rotatable about a second axis of rotation (Y), and a cutting device (6) with at least one blade (7) for separating the packaging material (4), which device is arranged in the anvil (5), wherein the at least one blade (7) is arranged on the anvil (5) in such a way that a minimum distance (5) between the sonotrode (3) and a cutting edge (8) of the blade (7) is maintained, and so the packaging material (4) can be severed without any contact between the sonotrode (3) and the blade (7).

16 Claims, 2 Drawing Sheets

(51) Int. Cl.
 *B29C 65/00* (2006.01)
 *B65B 51/30* (2006.01)
 *B65B 61/06* (2006.01)
 *B29C 65/08* (2006.01)
 *B29C 65/74* (2006.01)

(52) U.S. Cl.
 CPC ......... *B29C66/1122* (2013.01); *B29C 66/4312* (2013.01); *B29C 66/81417* (2013.01); *B29C 66/83513* (2013.01); *B29C 66/849* (2013.01); *B65B 51/225* (2013.01); *B65B 51/306* (2013.01); *B65B 61/06* (2013.01); *B29C 65/7443* (2013.01); *B29C 66/9516* (2013.01)

(56) References Cited

U.S. PATENT DOCUMENTS

| | | | | |
|---|---|---|---|---|
| 4,048,003 | A * | 9/1977 | Bolli | 156/515 |
| 4,244,158 | A * | 1/1981 | Nelham | 53/412 |
| 4,517,790 | A | 5/1985 | Kreager | |
| 4,840,009 | A * | 6/1989 | Rentmeester et al. | 53/374.4 |
| 4,949,846 | A * | 8/1990 | Lakey | 206/484 |
| 5,729,959 | A | 3/1998 | Spatafora et al. | |
| 5,826,403 | A * | 10/1998 | Haley | 53/450 |
| 6,379,483 | B1 | 4/2002 | Eriksson | |
| 7,325,373 | B2 | 2/2008 | Boldrini et al. | |
| 8,028,503 | B2 | 10/2011 | Capodieci | |
| 2009/0313944 | A1 | 12/2009 | Ghiotti et al. | |
| 2012/0090283 | A1 | 4/2012 | Ippers et al. | |

FOREIGN PATENT DOCUMENTS

| | | |
|---|---|---|
| ES | 2257974 | 8/2006 |
| JP | 2001180619 | 7/2001 |
| WO | 2008102250 | 8/2008 |
| WO | 2010081639 | 7/2010 |
| WO | 2010112282 | 10/2010 |

* cited by examiner

DEVICE AND METHOD FOR WELDING AND SEPARATING PACKAGING MATERIALS FOR A PACKAGE

BACKGROUND OF THE INVENTION

The present invention relates to a device and a method for welding and separating packaging materials for a package, having a combined ultrasonic welding device and cutting device which is used, in particular, in bag forming, filling and sealing machines.

Bag forming, filling and sealing machines, which pack sweets and other articles, are known in the prior art. In this context, a longitudinally closed tube, the one open end of which is sealed by a transverse sealing seam by means of an ultrasonic welding device comprising a sonotrode and an anvil, is usually produced from a film via a forming shoulder. Here, the packaging material is welded between the sonotrode and the anvil by touching of the two parts. After filling, the tube is then closed over the filling region by a further transverse sealing seam to form a tubular bag. In addition, bladed cutting devices are usually provided in order to separate the still joined bags. Due to contacts of the blade with the sonotrode, wear phenomena are obtained, so that the blades must be replaced, after a certain period of use. From WO 2008/102250, for example, it is also known that special hard metal inserts are used in the ultrasonic tools in order to reduce the contact-induced wear.

SUMMARY OF THE INVENTION

The inventive device has the advantage over the above that it allows a packaging material for a package, in particular a tubular bag, to be welded and separated without mechanical contact between the sonotrode and a blade arranged in the anvil. According to the invention, the device has for this purpose an ultrasonic welding device having a sonotrode and an anvil for sealing the packaging material, wherein the sonotrode is rotatable about a first axis of rotation and the anvil is rotatable about a second axis of rotation. Moreover, the device comprises a cutting device having at least one blade for separating the packaging material, which cutting device is arranged in the anvil. The at least one blade is here arranged on the anvil in such a way that a minimum distance between the sonotrode and a cutting edge of the blade is maintained, so that the packaging material is severed without any contact between the sonotrode and the blade. Additional structural parts, such as, for example, the hard metal inserts in devices of the prior art, for protection from wear caused by contact of the ultrasonic tools, can therefore be dispensed with. The device according to the invention further has a long service life.

According to a preferred embodiment of the invention, the device also comprises an adjusting device, which adjusts the position of the blade in the anvil in the radial direction of the anvil. The blade position can thereby be easily adapted to the vibration amplitude of the sonotrode in accordance with the packaging material to be separated. Tool changeover times of the device are thus substantially reduced, which helps to increase the cost effectiveness of production.

Further preferably, the blade has an auxiliary cutting edge in order to make an additional cut, in particular a tear slit, in the packaging material. As a result of the auxiliary cutting edge, a tearing aid can be introduced at the same time as two packages are separated. The work steps required for the production of a package can thereby be reduced or the necessary time span shortened.

Preferably, the blade projects only slightly, in particular by 5 µm to 50 µm, preferably 10 µm to 20 µm, from a surface of the anvil which faces toward the sonotrode. The blade can thereby lead the packaging material by this measure up to the sonotrode, the high-frequency vibration of which severs the packaging material on the cutting edge of the blade without any contact force between the sonotrode and the anvil.

According to a further preferred embodiment of the invention, a surface of the sonotrode which is directed toward the anvil is formed in sheet-like configuration and without recesses. This simple shaping contributes substantially to improved sealed seam quality and to more favorable production costs of the sonotrode elements.

According to a further preferred embodiment of the invention, the sonotrode is configured with a shallow angle in the shape of a roof. In the welding and separation of the packaging material, the rotational movements of the device can thereby be reduced to a small angular measure and the entire production process accelerated.

Preferably, the blade is mounted fixedly in the cutting device. An elastic element between the blade and the anvil for the decoupling of vibrations between the sonotrode and the anvil, which helps to further simplify and reduce the cost of the device, can hence be dispensed with. Moreover, the exchange and adjustment of the blade are thereby simplified.

Further preferably, the cutting device is arranged between a first sealing region and a second sealing region of the anvil. A particularly compact structure of the device is hereby achieved.

The invention further relates to a method for welding and separating a packaging material. A reliable sealing and contactless and wear-free separation of the packing material is here achieved according to the invention by virtue of the fact that, in a first method step, the packaging material is positioned between a sonotrode and an anvil of an ultrasonic welding device and a foot seam of a preceding package is sealed. After this, the packaging material is severed between the preceding package and a following package, wherein respectively a rotation in a direction of feed of the packaging material is realized both by the sonotrode about a first axis of rotation and by the anvil about a second axis of rotation. A blade of a cutting device, which blade projects from a surface of the anvil which faces toward the sonotrode, hereupon touches the packaging material and leads this in the direction of the sonotrode. The sonotrode sets the packaging material in vibration, so that the packaging material is severed by the blade. In every position of the sonotrode and of the anvil, a minimum distance between the blade and the sonotrode is hereupon maintained, so that no contact is made between the sonotrode and the blade. In a concluding method step, a head seam of the following package is sealed.

Further preferably, a cutting force of the cutting device is less than a sealing force of the ultrasonic welding device. This helps to improve the sealing quality of the head and foot seams of the packages. The blade is also preferably adjustable, so that the size of the minimum distance can be adapted and adjusted to the vibration amplitude of the sonotrode and in accordance with the material thickness and material properties of the packaging material.

BRIEF DESCRIPTION OF THE DRAWINGS

An illustrative embodiment of the invention is described in detail below with reference to the accompanying drawing, wherein.

DETAILED DESCRIPTION

A device 1 for welding and separating a packaging material for a package according to a preferred illustrative embodiment of the invention is described in detail below with reference to FIGS. 1 to 4.

Figure 1:
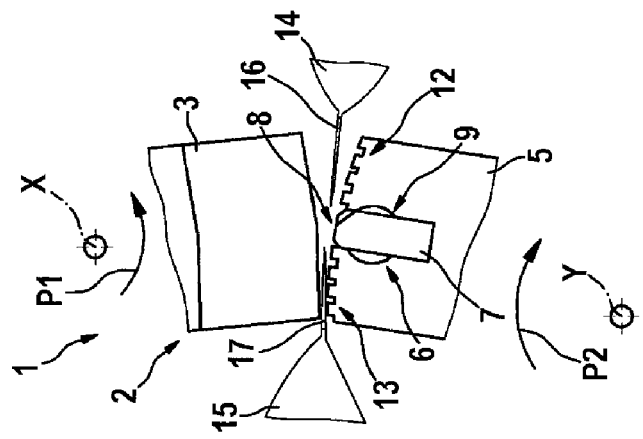
FIG. 1 is a schematic sectional representation of the device according to the invention in a first setting.

As can be seen from FIG. 1, the device 1 for welding and separating a packaging material 4 comprises an ultrasonic welding device 2 having a sonotrode 3 and an anvil 5, between which the packaging material 4, which forms a preceding package 14 and a following package 15, is led through in a direction of feed F marked with an arrow. The sonotrode 3 is rotatable about a first axis of rotation X and the anvil 5 is rotatable about a second axis of rotation Y.

Inside the anvil 5 is arranged a cutting device 6 having a blade 7 and an adjusting device 9 by means of which the blade 7 is fixed and adjusted in the radial direction of the anvil 5. The cutting device 6 is arranged between a first sealing region 12 and a second sealing region 13 of the anvil 5. In an alternative embodiment of the device according to the invention, a plurality of blades or a blade 7 having an auxiliary cutting edge can also be arranged in the anvil 5, for example to produce an additional cut, in particular a tear cut.

Figure 4:
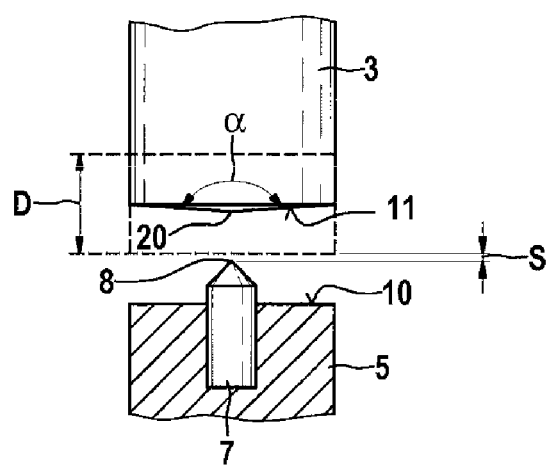
FIG. 4 is an enlarged schematic sectional representation of the sealing tools of the device of FIG. 1.

As can be seen from the enlarged schematic sectional representation of FIG. 4, the blade 7 projects from a surface 10 of the anvil 5 which faces toward the sonotrode 3. A minimum distance S between a cutting edge 8 of the blade 7 and a roof point 20 of the sonotrode 3, given a maximum deflection (shown in symbolized representation with a dashed line) of the sonotrode 3 vibrating with an amplitude D, is here maintained. This minimum distance S preferably lies within a range from 5 μm to 50 μm. As can further be seen from FIG. 4, a surface 11 of the sonotrode which is directed toward the anvil 5 is configured without recesses and with an angle α in a roof shape with slight inclination. This angle preferably lies within a range from 165° to 175° and is represented in FIG. 4 by way of example with α=172°.

Figure 2:
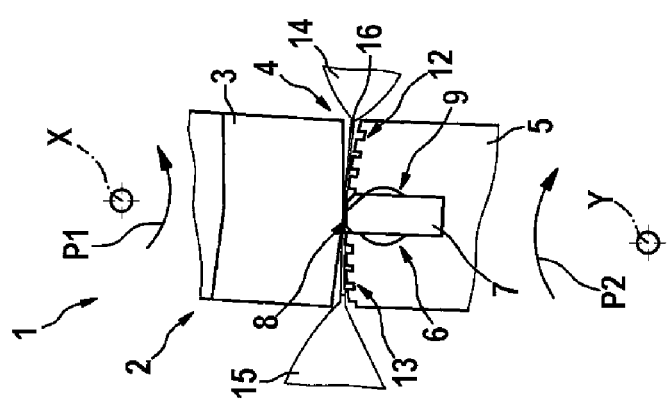
FIG. 2 is a schematic sectional representation of the device of FIG. 1 in a second setting.
Figure 3:
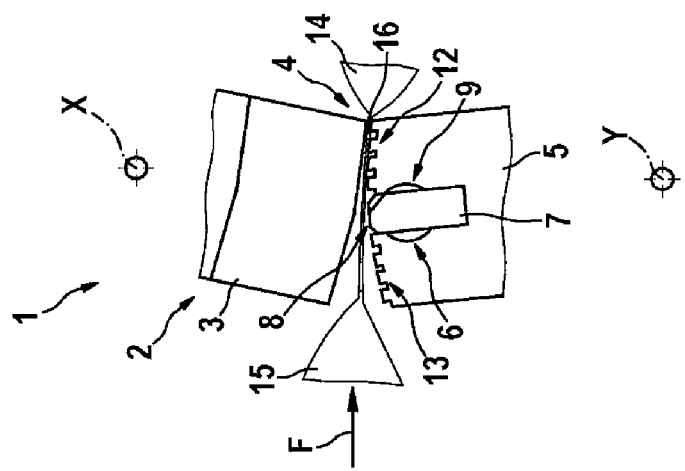
FIG. 3 is a schematic sectional representation of the device of FIG. 1 in a third setting.

The welding and separation of the packaging material 4 of a package is realized in three steps or settings, represented in FIGS. 1 to 3. In the first setting of the ultrasonic welding device 2, shown in FIG. 1, a foot seam 16 of the preceding package 14 is first of all sealed at the first sealing region 12, which is fixed between the sonotrode 3 and the anvil 5.

In the second setting of the ultrasonic welding device 2, represented in FIG. 2, the packaging material 4 is severed between the preceding package 14 and the following package 15. To this end, the sonotrode 3 performs a rotation about its axis of rotation X in the direction of an arrow P1 and the anvil 5 executes a rotation about its axis of rotation Y in the direction of an arrow P2 of respectively 8°, according to the example represented in FIG. 4. The roof point 20 (see FIG. 4) of the surface 11 of the sonotrode 3 and the cutting edge 8 hence lie opposite one another in the radial direction. The packaging material (not represented in FIG. 4 for the sake of better clarity) is raised or guided from the blade 7 in the direction of the sonotrode 3 by the rotation of the anvil 5 and rests on the cutting edge 8. Due to the vibrations of the sonotrode 3, the packaging material 4 is severed between the roof point 20 and the cutting edge 8 of the blade, the minimum distance S being set smaller than or, at most, equally as large as a material thickness of the packaging material, so that no mechanical contact takes place between the sonotrode 3 and the blade 7.

In the third setting of the ultrasonic welding device 2, represented in FIG. 3, a head seam 17 of a following package 15 is sealed at the second sealing region 13. To this end, the sonotrode 3 and the anvil 5 respectively perform a further rotation of 8° about their axis of rotation X and Y in the direction of the arrow P1 and P2 respectively and seal between the sonotrode 3 and the anvil 5 the head seam 17 of the following package 15.

The device according to the invention can be used or retrofitted on conventional rotary bag forming, filling and sealing devices and allows the contact-free and wear-free separation of the packaging material with minimal cutting forces which are smaller than the sealing forces for producing the head and foot seams. Due to the minimal rotational movements of the ultrasonic sealing tools, very short work cycles and a correspondingly high production throughput are attainable.

The invention claimed is:

1. A device for welding and separating a packaging material (4) for a package, the device comprising:
   an ultrasonic welding device (2) having a sonotrode (3) and an anvil (5) for sealing the packaging material (4), wherein the sonotrode (3) is rotatable about a first axis of rotation (X) and the anvil (5) is rotatable about a second axis of rotation (Y), and
   a cutting device (6) having at least one blade (7) for separating the packaging material (4), the cutting device arranged in the anvil (5),
   wherein the at least one blade (7) is arranged on the anvil (5) in such a way that a minimum distance (S) between the sonotrode (3) and a cutting edge (8) of the blade (7) is maintained, so that the packaging material (4) can be severed without any contact between the sonotrode (3) and the blade (7), and
   wherein the sonotrode (3) is formed without a recess into which the blade (7) extends.

2. The device as claimed in claim 1, further comprising an adjusting device (9), which adjusts a position of the blade (7) in the anvil (5) in a radial direction of the anvil (5).

3. The device as claimed in claim 1, characterized in that the blade (7) projects 5 μm to 50 μm from a surface (10) of the anvil (5) which faces toward the sonotrode (3).

4. The device as claimed in claim 1, characterized in that the minimum distance (S) between the sonotrode (3) and the cutting edge (8) of the blade (7) lies within a range from 5 μm to 50 μm.

5. The device as claimed in claim 1, characterized in that the sonotrode (3) is configured in the shape of a "V" with an obtuse angle (α).

6. The device as claimed in claim 1, characterized in that the blade (7) is mounted fixedly in the cutting device (6).

7. The device as claimed in claim 1, characterized in that the cutting device (6) is arranged between a first sealing region (12) and a second sealing region (13) of the anvil (5).

8. A method for welding and separating a packaging material (4), the method comprising:
   positioning of the packaging material (4) between a sonotrode (3) and an anvil (5) of an ultrasonic welding device (2) and sealing of a foot seam (16) of a preceding package (14),
   separation of the packaging material (4) between the preceding package (14) and a following package (15), wherein respectively a rotation in a direction of feed (F) of the packaging material (4) is realized both by the sonotrode (3) about a first axis of rotation (X) and by the anvil (5) about a second axis of rotation (Y), and a blade (7) of a cutting device (6), the blade projects from a surface (10) of the anvil (5) which faces toward the sonotrode (3), touches the packaging material (4) and leads in a direction of the sonotrode (3), so that the packaging material (4) is severed by the blade (7), wherein in every position a minimum distance (S) between the blade (7) and a circle concentric with and having a radius equal to an outermost radius of the sonotrode (3) is maintained, so that no contact is made between the sonotrode (3) and the blade (7) and such that the blade (7) does not extend across the circle, and sealing of a head seam (17) of the following package (15).

9. The method as claimed in claim 8, characterized in that a cutting force of the cutting device (6) is less than a sealing force of the ultrasonic welding device (2).

10. The method as claimed in claim 8, characterized in that the blade (7) is adjustable.

11. A device for welding and separating a packaging material (4) for a package, the device comprising:
   an ultrasonic welding device (2) having a sonotrode (3) and an anvil (5) for sealing the packaging material (4), wherein the sonotrode (3) is rotatable about a first axis of rotation (X) and the anvil (5) is rotatable about a second axis of rotation (Y), and
   a cutting device (6) having at least one blade (7) extending in a radial direction for separating the packaging material (4), the cutting device arranged in the anvil (5),
   wherein the at least one blade (7) is arranged on the anvil (5) in such a way that a minimum distance (S) between the sonotrode (3) and a cutting edge (8) of the blade (7) is maintained, so that the packaging material (4) can be severed without any contact between the sonotrode (3) and the blade (7),
   wherein the sonotrode (3) is configured in the shape of a "V" with an obtuse angle ($\alpha$) defining an apex (20), and
   wherein the apex (20) and the cutting edge (8) are aligned in the radial direction when the cutting edge (8) reaches a point closest to the sonotrode (3).

12. The device as claimed in claim 11, further comprising an adjusting device (9), which adjusts a position of the blade (7) in the anvil (5) in a radial direction of the anvil (5).

13. The device as claimed in claim 11, characterized in that the blade (7) projects 5 μm to 50 μm from a surface (10) of the anvil (5) which faces toward the sonotrode (3).

14. The device as claimed in claim 11, characterized in that the minimum distance (S) between the sonotrode (3) and the cutting edge (8) of the blade (7) lies within a range from 5 μm to 50 μm.

15. The device as claimed in claim 11, characterized in that the blade (7) is mounted fixedly in the cutting device (6).

16. The device as claimed in claim 11, characterized in that the cutting device (6) is arranged between a first sealing region (12) and a second sealing region (13) of the anvil (5).

* * * * *